Patented Aug. 17, 1926.                                                      1,596,841

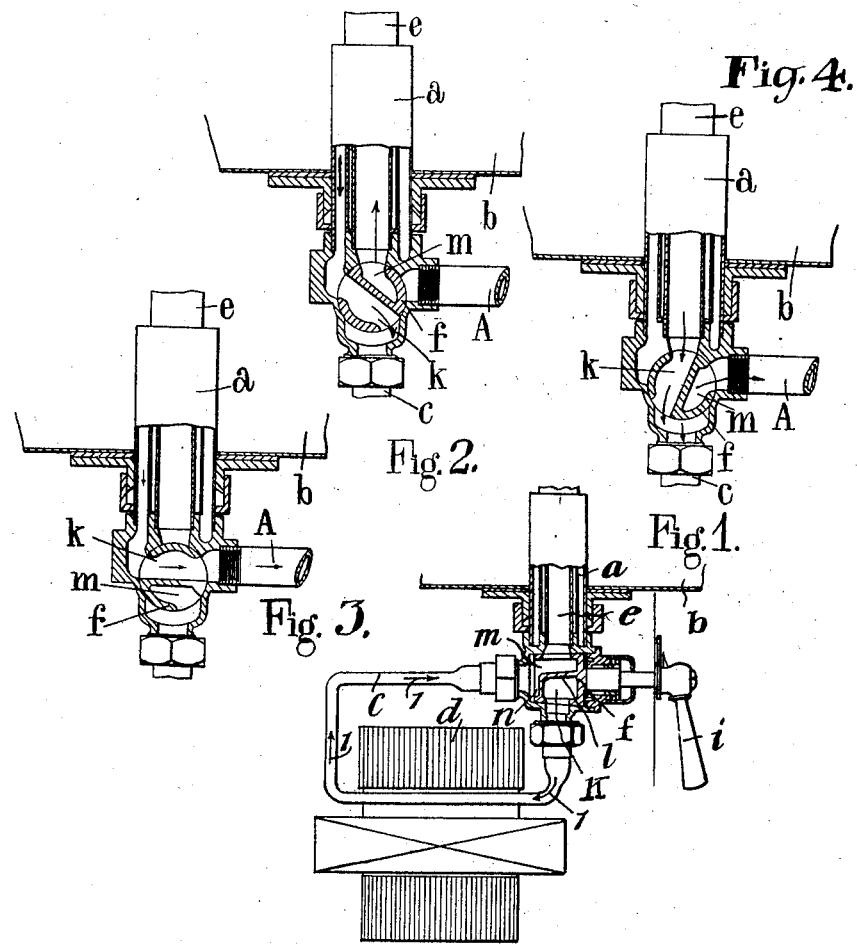

UNITED STATES PATENT OFFICE.

CLARENCE HAROLD LAUTH, OF LONDON, ENGLAND.

SUPPLY OF HOT WATER FOR DOMESTIC AND OTHER PURPOSES.

Application filed August 15, 1925, Serial No. 50,476, and in Great Britain July 22, 1924.

This invention relates to an improved system of hot water supply for domestic and other purposes.

The main object of the invention is to provide a system which will be capable of being used as a geyser for quickly heating cold water, as a storage tank or like system for gradually heating up the water therein by means of circulating pipes and as a combined geyser and storage tank or like system by further heating the hot water whilst it is being drawn from the storage tank or the like.

Another object of the invention is to ensure that water shall not be trapped in the heating part of the system and thereby cause dangerous temperatures and pressures.

Other objects of the invention are hereinafter more particularly referred to.

The invention more particularly refers to a system in which a cock is mounted in a conduit which opens at one end in the lower part and at the other end in the upper part of a storage tank or like water receptacle, said conduit being heated electrically, by gas or in any other suitable manner, and the said cock being adapted when in one position, to allow the water to circulate and when in another position, to shut off the circulation and allow the water to be withdrawn. According to the present invention the said cock is constructed and placed in the conduit so as to allow the water to circulate when in one position and to shut off circulation and allow the water to be withdrawn from the upper part of the tank along the heating means when in another position.

A further feature of the invention consists in arranging that the water be withdrawn from the upper part of the tank through the conduit in the same direction as the direction of circulation in order to ensure that the water shall leave at the hottest part of the conduit.

The invention also consists in the improved system of water supply hereinafter described with reference to the accompanying drawings to illustrate diagrammatically by way of example the form of carrying the invention into effect.

Fig. 1 is a vertical sectional view partly in section thereof, and

Figs. 2, 3 and 4 are fragmentary sectional details thereof showing the relative positions of the pipes, valve and tap for three different conditions of operation.

Similar characters of reference are employed in all of the above described views to indicate corresponding parts.

Referring now, more particularly, to the accompanying drawings the parts of the descending and ascending pipes which penetrate into the tank $b$ are concentric with one another as indicated by parts $a$ and $e$, the ascending pipe section $e$ being extended above the section $a$ which latter terminates near the bottom of the tank. Both of the concentric sections $a$ and $e$ communicate with the upper part of the valve casing situated immediately beneath the tank and these together with the heating section $c$ constitute a conduit for the water. The pipe section $c$ is arranged in heat transfer relation to the heater $d$ in the form of a heating transformer. A single valve $f$ is mounted in the valve casing and is of the three way type being positively operated by a handle $i$ situated exteriorly of the casing and the tank. All controls are effected by means of this single valve which is provided with a passage $k$ separated by a partition wall $l$ from a passage $m$ which is in open communication with the end of the valve and with the ascending part of the section $c$. Fig. 2 illustrates the position of the valve when the water circulates in the system the path of the flow being indicated by arrows. The water from the bottom of the tank flows down the pipe $a$ through the passage $k$ of the valve through the pipe $c$ past the heating transformer in the direction indicated by the arrows in Fig. 1 into the open end $n$ of the valve and the casing passage $m$ and up the pipe $e$ into the upper part of the tank.

Fig. 3 illustrates the position for withdrawing cool water from the bottom of the tank through the pipe $a$ and passage $k$.

When hot water is to be withdrawn the parts are arranged as in Fig. 4 and in this connection it will be noted that the water flows from the top of the tank through the pipe section $e$, passage $k$, pipe section $c$ in the direction indicated by the arrows in Fig. 1, open end $n$ of the valve in the casing and the passage $m$ to tap A.

By turning the valve $f$ from the position shown in Fig. 4 slightly to the right, so that the passages $k$ and $m$ are in communication with the tap A it is possible to withdraw water through both pipes $a$ and $e$.

It will be seen that in the forms of construction illustrated the water is withdrawn from the upper part of the tank along the heating means in the same direction as the direction of circulation.

In all of the forms of construction the circulating conduit which comprises the pipe sections $a$, $e$ and $c$ together with the casing of the valve $f$ should be so arranged or heated as to ensure the rising of the water in the ascending branch when first starting up. It is to be understood that although it is preferred to heat the water electrically such as by the known transformer action, any other method of heating may be used. It is also to be understood that the other details for carrying the invention into effect may be modified in various respects without in any way departing from the spirit of the invention.

Having thus described the invention what is claimed as new and desired to be secured by Letters Patent is:—

A system of hot water supply for domestic and other purposes comprising in combination with a tank and a heater, a circulating conduit including a valve casing, concentrically arranged pipes between the casing and tank one of which terminates near the top and the other near the bottom of the tank, a heating pipe section communicating with the casing and arranged in heat transfer relation to the heater, a withdrawal pipe leading from the casing, a valve mounted within the casing, a handle connected to the valve and positioned exteriorly of the tank and casing which when it and the valve are arranged in one position water is allowed to circulate in the conduit and when in another position circulation is cut off and hot water from the tank is allowed to be withdrawn along the heating means in the same direction as the direction of circulation.

In testimony whereof I have signed my name to this specification.

CLARENCE HAROLD LAUTH.